Aug. 14, 1951 W. F. BRODERICK 2,564,148
LAWN EDGER
Filed Dec. 12, 1949
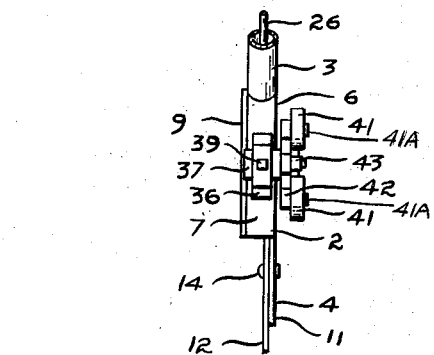
Fig. 3.
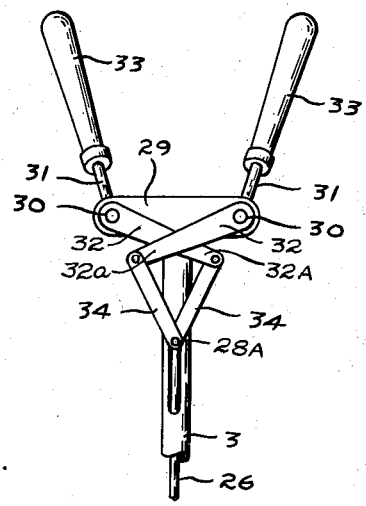
Fig. 4.
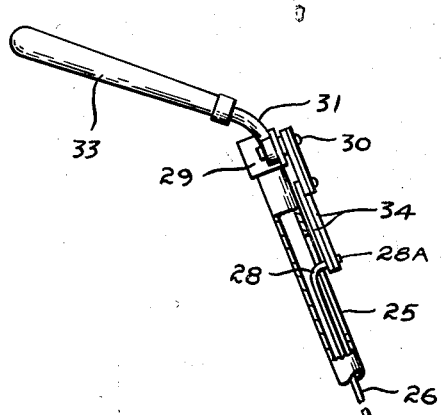
Fig. 1.
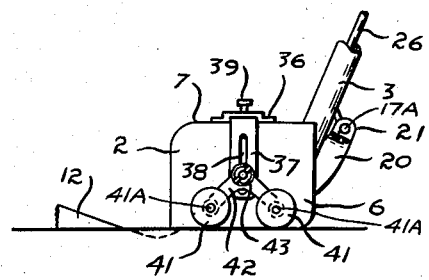
Fig. 2.
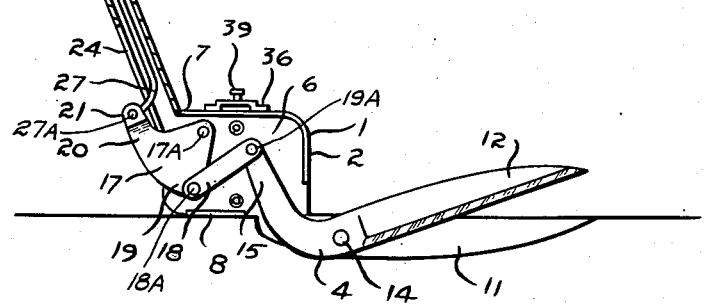
INVENTOR
WILLIAM F. BRODERICK
Ernest E Carver
ATTORNEY Patented Aug. 14, 1951

2,564,148

UNITED STATES PATENT OFFICE 2,564,148

LAWN EDGER

William F. Broderick, Vancouver,
British Columbia, Canada

Application December 12, 1949, Serial No. 132,586

1 Claim. (Cl. 56—241)

My invention relates to improvements in lawn edgers.

One of the objects of the invention is to provide an edger with a pair of horizontally supported shears having one fixed blade and a second blade pivoted thereon, and to provide means for utilizing both hands to rock the pivoted blade. A further object is to provide that the hand movement in opening and closing the shears does not influence the direction of travel of the shears. A still further object is to provide that the movement of both hands is but slightly inclined from the horizontal and is in directions generally transverse to the cut of the shears, or in other words the hand movement is generally the most natural movement of a person in moving his two hands towards or away from each other. It is also an object to support the fixed blade at a given height relative to the surface of the lawn being trimmed and in line with its surface, yet to permit said blade to be tilted up or down as required.

Referring to the drawings—

Figure 1 is a side elevational view of the invention with the side cover removed.

Figure 2 is a part elevational view of the lawn side of the invention.

Figure 3 is a plan view of Figure 2.

Figure 4 is a front elevational view showing the handles and their linkage with the shear operating rod.

In the drawings like characters of reference indicate corresponding parts in each figure.

The numeral 1 indicates generally a lawn edger having a housing 2 provided with a rearwardly sloping tubular shaft 3 and a forwardly extending pair of shears 4. The housing 2 is provided with a side wall 6, a top wall 7, a bottom wall 8 and a removable side cover 9. The pair of shears 4, see particularly Figure 1, consists of a fixed blade 11, secured to the side wall 6, and a movable blade 12 rockingly mounted upon the fixed blade by a pivot pin 14, the said movable blade having a shank 15. A bell crank 17 is rockingly mounted upon a pin 17A upon the side wall 6 of the housing 2 and a link 18 is pivotally connected as at 18A to one leg 19 of said bell crank and to the shank 15 of the movable blade 12 as at 19A. A leg 20 of the bell crank 17 extends outwardly beyond the housing 2 and terminates in a fork 21.

The shaft 3 is slotted as at 24 and 25 and within said shaft is a rod 26 the ends of which are cranked as at 27 and 28. The cranked ends 27 and 28 respectively project outwardly through the slots 24 and 25 and the end 27 is secured to the fork 21 of the bell crank 17 by a pin 27A. A cross head 29 is fitted at the upper end of the tubular shaft 3, which cross head is provided at opposite ends with pivot pins 30. Each pin has secured to one of its ends a lever 31 and secured to its opposite end is a lever 32, the levers 31 and 32 form bell cranks 32A. The outer end of each of the levers 31 is provided with a handle 33. The inner ends of the levers 32, or the lower ends of the bell cranks 32A, extend diagonally inward and cross each other as shown in Figure 4. The inner extremities of the levers 31 are pivotally connected to links 34 which are pivotally connected to the cranked end 28 of the rod 26 as at 28A to reciprocate said rod and actuate the movable blade 12.

The top wall 7 of the housing 2 is provided with a keeper 36 and an inverted L-shaped bracket 37 having a vertical slot 38 in its depending leg is adjustably secured within the keeper by means of a clamping screw 39. Tandem wheels 41 are journalled as at 41A upon a yoke 42 which is vertically adjustable along the slot 38 of the bracket 37 by means of a wing nut and bolt 43.

In operation, the tandem wheels 41 are adjusted as to height so that when riding upon the surface of a lawn to be trimmed the upper edge of the fixed blade 11 of the shears 4 will be low enough in the trench or earth border of the lawn as to undercut grass extending over the lawn edge.

It will be noticed in operating the handles 33 simultaneously and in opposite directions to actuate the movable shear blade 12, that the force exerted by both hands will be balanced and there will be no tendency to move the shears laterally, consequently the tool can be pushed forwardly into its cut without deviating in direction except when a turn is desired.

What I claim as my invention is:

A lawn edger comprising a housing, a pair of shears having one blade fixedly carried by the housing to cut in a vertical plane and a movable blade pivotally mounted upon the fixed blade, a tubular shaft extending upwards from the housing, said shaft having a cross head, a bell crank rockingly mounted at each end of the cross head, said bell cranks each having a handled lever extending upwardly from the pivotal point of the bell crank, and a diagonally projecting lever extending below said pivotal point, a rod extending downwardly of the tubular shaft, said rod having an operating connection with the movable blade and a link connecting the upper end of the rod with the free ends of each of the diagonally projecting levers.

WILLIAM F. BRODERICK.

REFERENCES CITED

The following references are of record in the file of this patent:

UNITED STATES PATENTS

| Number | Name | Date |
|---|---|---|
| 361,911 | Weston | Apr. 26, 1887 |
| 488,647 | Barnes | Dec. 27, 1892 |
| 1,199,134 | Walters et al. | Sept. 26, 1916 |
| 1,254,284 | Southwood | Jan. 22, 1918 |
| 1,795,421 | Biltz | Mar. 10, 1931 |

FOREIGN PATENTS

| Number | Country | Date |
|---|---|---|
| 12,628 | Great Britain | Mar. 1, 1887 |